(12) United States Patent
Fischer et al.

(10) Patent No.: US 6,365,661 B1
(45) Date of Patent: Apr. 2, 2002

(54) NANOCOMPOSITE MATERIAL

(75) Inventors: Hartmut Rudolph Fischer, Mierlo; Leon Hubertus Gielgens, Utrecht, both of (NL)

(73) Assignees: Nederlandse Organisatie voor Toegepast; Natuurwetenschappelijk Onderzoek TNO, both of (NL)

( * ) Notice: Subject to any disclaimer, the term of this patent is extended or adjusted under 35 U.S.C. 154(b) by 0 days.

(21) Appl. No.: 09/582,900

(22) PCT Filed: Jan. 8, 1999

(86) PCT No.: PCT/NL99/00007

§ 371 Date: Oct. 20, 2000

§ 102(e) Date: Oct. 20, 2000

(87) PCT Pub. No.: WO99/35186

PCT Pub. Date: Jul. 15, 1999

(30) Foreign Application Priority Data

Jan. 9, 1998 (NL) ............................................. 1008003

(51) Int. Cl.⁷ ................................................ C08K 3/22
(52) U.S. Cl. ...................... 524/445; 524/449; 524/450; 524/451; 524/534; 524/789; 524/791; 524/856; 523/209; 523/216; 523/521
(58) Field of Search ................................ 524/445, 449, 524/450, 451, 534, 789, 791, 856; 523/209, 216, 521

(56) References Cited

U.S. PATENT DOCUMENTS

| | | | |
|---|---|---|---|
| 3,539,306 A | * 11/1970 | Kumura et al. | |
| 3,650,704 A | * 3/1972 | Kumura et al. | |
| 4,558,102 A | * 12/1985 | Miyata | ........................ 525/348 |
| 4,810,734 A | 3/1989 | Kawasumi et al. | .......... 523/216 |
| 4,814,364 A | 3/1989 | Yoshizaki et al. | ........... 523/100 |
| 4,889,885 A | * 12/1989 | Usuki et al. | ................. 524/445 |
| 5,554,670 A | * 9/1996 | Giannelis et al. | ........... 523/209 |
| 5,658,653 A | * 8/1997 | Bosnyak et al. | ............. 428/328 |
| 5,728,363 A | * 3/1998 | Martin et al. | ................ 423/593 |
| 5,728,364 A | * 3/1998 | Martin et al. | ................ 423/593 |
| 5,728,366 A | * 3/1998 | Martin et al. | ................ 423/593 |
| 5,776,424 A | * 7/1998 | Martin et al. | ................ 423/593 |

FOREIGN PATENT DOCUMENTS

| | | |
|---|---|---|
| WO | WO 93/11190 | 6/1993 |
| WO | WO 96/08526 | 3/1996 |
| WO | WO 99/07790 | 2/1999 |
| WO | WO99/35185 | 7/1999 |
| WO | WO-99/47598 A1 * | 9/1999 |

OTHER PUBLICATIONS

Titulaer, HT., The Formulation of Ice Between Hydrotalcite Particles Measured by Thermoporometry, Clay Minerals (1996) 31, 263–277.l.*
Yun, SK., et al. Water Content and Particle Texture of Synthetic Hydrotalcite–like Layered Double Hydroxides, Chemical Matter (1995), 7, 348–354.*
Tagaya, H., et al. Preferential Intercalation of Isomers of Naphthalenecarboxylate Ions into the Intelayer of Layered Double Hydroxides, Chm. Matter (1993), 5, 1431–1433.*
Kopka, H., et al Anionic Surfactants Between Double Metal Hydroxide Layers, Journal of Colloid and Interface Science, vol. 123, No. 2, Jun. 1988.*
Miyata, S., Anion–Exchange Properties of Hydrotalcite–Like Compounds, Clay and Clay Minerals, vol. 31, No. 4, 305–311.*
Database WPI Section Ch. Week 8043 Dewwent Publications Ltd., London, GB;, AN 80–75845 C XP002061067 &JP 116743 A (Asahi Dow Ltd), Sep. 8, 1980.
Database WPI Section Ch. Week 9411 Dewwent Publications Ltd., London, GB; AN 94–087311 XP002061068 & JP 06 037212 A (Toray Ind Inc) Feb. 10, 1994.

* cited by examiner

*Primary Examiner*—Margaret Medley
(74) *Attorney, Agent, or Firm*—Roberts & Mercanti, LLP

(57) ABSTRACT

The invention relates to a nanocomposite material based on a polymeric matrix and a layered double hydroxide, wherein the polymeric matrix is present in an amount of at least 50% by weight, based on the nanocomposite material, and wherein the layered double hydroxide contains an amount of anions of at least 20%, based on the total number of anions of the layered double hydroxide, which anions are compatible and/or reactive with the polymeric matrix, and wherein at least 5% of the above amount of anions contain a second charge-carrying group. The invention further relates to a method for preparing such a nanocomposite material and to a shaped article from such a nanocomposite material.

20 Claims, No Drawings

NANOCOMPOSITE MATERIAL

This application is a 371 of PCT/NL99/00007 dated Jan. 8, 1999.

This invention relates to a nanocomposite material, a method for the preparation of a nanocomposite material and to a shaped article of a nanocomposite material.

Over the past decades, it has already been frequently proposed to improve the properties of polymeric materials by incorporating a certain amount of a clay in those materials. The presence of a clay in a polymeric material is beneficial particularly to properties such as the mechanical strength and the heat resistance of the polymeric material.

To thus obtain a nanocomposite material that has the desired properties, it is important that the clay be dispersed in the polymeric material sufficiently homogeneously. This is not easy because the clay and the polymeric material are of a highly different nature. Polymers constitute a normally non-polar, organic material, whereas the clay is a much more polar, inorganic material. Due to this difference, the materials exhibit poor miscibility with respect to each other; they are intrinsically non-miscible. In the literature, it has been proposed first to modify the clay in different ways before it is mixed with a polymeric material. It has also been proposed to modify the clay and then to mix it with a monomeric material, which is thereupon polymerized in the presence of the clay.

In U.S. Pat. Nos. 4,889,885 and 4,810,734, it is described how a cationic clay is first modified with a swelling agent, which increases the interlayer distance of the clay structure. Used as swelling agents are surfactants, with a head group formed by an ammonium, pyridinium, sulfonium or phosphonium group, and one or more non-polar tails. The cationic head group of the surfactant is exchanged with cations between the crystalline layers of the clay and the tails should be compatible with the polymeric material. Then the modified clay is mixed with monomeric material, which can enter into a bonding interaction with the tails of the swelling agent. When, finally, the monomeric material is then polymerized, the polymers are formed between the layers of the clay and a nanocomposite material is obtained.

A disadvantage of these known nanocomposite materials is that the quality of the end product is very highly dependent on the quality of the clay used. Cationic clay is virtually always a natural product, which is not homogeneous in composition. This inhomogeneity of the clay leads to inhomogeneities in the composition of the nanocomposite material, which means that the desired properties are not always achieved in a sufficient quality. It is therefore desirable to make it possible to incorporate into polymeric material a kind of clay that has a better controllable quality and composition.

U.S. Pat. No. 5,658,653 describes a polymer composite comprising a polymeric matrix in which a filler is incorporated. The polymeric matrix can be a polyolefin, polystyrene, polyurethane, epoxy resin, polyimide, polyacetal, polyester, polyvinyl, polyether or polyacryl. The filler is a mixed metal hydroxide that satisfies a specific formula.

In order to enhance the compatibility of the polymeric material and the filler, the surface of the filler has been modified in that particular groups have been provided thereon. These groups can be, for instance, organic acids, salts of sulfonic acids or phosphonic acids. It is also possible that anions of the filler have been exchanged with groups that form hydrogen bridges with the polymeric matrix.

A disadvantage of the material described in the above U.S. patent specification is that the filler is not homogeneously dispersed in the polymeric matrix. This inhomogeneity is presumably due to the fact that only the The object of the present invention is to provide a method for preparing a nanocomposite material comprising a polymeric matrix in which a clay is incorporated, which nanocomposite material is very homogeneous in composition. It is further contemplated for the clay to be of a kind that has a properly controllable quality and composition.

According to the invention, this object is achieved by incorporating a layered double hydroxide in a polymeric material, which layered double hydroxide is modified in a specific manner. Layered double hydroxides are anionic clays, which, surprisingly, have presently been found to be modifiable so as to allow of homogeneous dispersion in a polymeric material.

Accordingly, the invention relates to a nanocomposite material based on a polymeric matrix and a layered double hydroxide, wherein the polymeric matrix is present in an amount of at least 50% by weight, based on the nanocomposite material, and wherein the layered double hydroxide contains an amount of anions of at least 20%, based on the total number of anions of the layered double hydroxide, which anions are compatible and/or reactive with the polymeric matrix, and wherein at least 5% of said amount of anions contain a second charge-carrying group.

It has been found that a nanocomposite material according to the invention has highly favorable properties. Thus, the heat resistance, the mechanical strength and the impact resistance of a polymeric material in which a layered double hydroxide is incorporated to obtain a nanocomposite material according to the invention are strongly improved compared with the same properties of the polymeric material in which no layered double hydroxide is incorporated. It has further been found that the permeability to gases and liquids, such as oxygen, water vapor and hydrocarbons, has been reduced to a considerable extent. Since layered double hydroxides can be prepared synthetically, it is possible, according to the invention, to prepare a nanocomposite material of a constant, controllable quality. It has furthermore been found that, partly due to the specific anions which are present in the layered double hydroxide, a very homogeneous distribution of the layered double hydroxide in the polymeric matrix is accomplished.

For that matter, it is known from U.S. Pat. No. 4,558,102 that a particular kind of layered double hydroxide, a hydrotalcite, can be incorporated into a halogen-containing rubber composition as an acid-acceptor to improve the water resistance of the rubber composition. Optionally, the hydrotalcite aggregates used can be modified with at most 10% by weight of a surfactant. What is involved here, however, is only a modification of the surface of the aggregates, whereby the clay is not sufficiently modified to allow of homogeneous dispersal in the rubber composition.

Further, it is known to improve the properties of a hydrotalcite by incorporating a small amount of a polymeric material. Challier et al., in J. Mater. Chem., 1994, 4, 367–371, have proposed to incorporate in a hydrotalcite a monolayer or bilayer of a polymeric material between each two layers of hydrotalcite to render the hydrotalcite electrically conductive.

A nanocomposite material according to the invention consists for the most part of the material of the polymeric matrix, comprising at least 50% and preferably at least 70% by weight thereof. Both homopolymers and copolymers can serve as polymeric matrix. It is one of the advantages of the invention that through the choice of the anions of the layered double hydroxide, any polymeric matrix can be modified with a layered double hydroxide. Thus, by providing the appropriate ingredients, for instance in the form of a kit, those skilled in the art are enabled to prepare, for any desired application, a combination of a particular layered double hydroxide and a particular polymeric material, and thereby a desired nanocomposite material.

Suitable polymeric materials to serve as polymeric matrix in a nanocomposite material according to the invention are both poly-adducts and polycondensates. Preferably, the polymeric matrix has a degree of polymerization of at least 20, more preferably of at least 50. In this connection, for a definition of the degree of polymerization, reference is made to P. J. Flory, "Principles of Polymer Chemistry", New York, 1953. Examples are polyolefins, such as polyethylene or polypropylene, vinyl polymers, such as polystyrene, polymethyl methacrylate, polyvinyl chloride, polyvinylidene chloride or polyvinylidene fluoride, polyesters, such as polyethylene terephthalate or polycaprolactone, polycarbonates, polyaryl ethers, polysulfones, polysulfides, polyamides, polyether imides, polyether esters, polyether ketones, polyether ester ketones, polysiloxanes, polyurethanes and polyepoxides. Preferably used are polyolefins, vinyl polymers, polyesters, polycarbonates, polyamides, polyurethanes or polyepoxides, because the properties of these materials show a very strong improvement owing to the presence of a layered double hydroxide.

As stated, a nanocomposite material according to the invention is based, in addition to a polymeric matrix, on a layered double hydroxide (LDH). This material is a so-called anionic clay, consisting of small crystalline sheets of dimensions of a few nanometers, between which anions are located. By these anions are meant anions other than hydroxyl groups. A layered double hydroxide can be both natural and synthetic in nature. For a description of possible methods of preparation for a synthetic layered double hydroxide, reference is made to U.S. Pat. Nos. 3,539,306 and 3,650,704.

Preferably, the layered double hydroxide has a large contact surface and an ion exchange capacity of 0.5 to 6 milliequivalents per gram. An LDH preferably used is a hydrotalcite or a hydrotalcite-like material, because these materials can be readily prepared synthetically, while the desired properties can be eminently controlled.

Found to be uncommonly suitable are hydrotalcites that satisfy the formula (I):

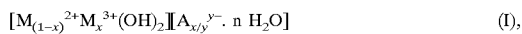

$$[M_{(1-x)}^{2+}M_x^{3+}(OH)_2][A_{x/y}^{y-}\cdot n\ H_2O] \qquad (I),$$

wherein $M^{2+}$ is a bivalent cation, $M^{3+}$ is a trivalent cation, x is a number between 0.15 and 0.5, y is 1 or 2, n is a number from 1 to 10, and A is an anion selected from the group consisting of $Cl^{31}$, $Br^-$, $NO_3^-$, $SO_4^{2-}$ and $CO_3^{2-}$. The bivalent cation is preferably selected from the group of bivalent magnesium, zinc, nickel, iron, copper, cobalt, calcium and manganese ions and combinations of these bivalent cations. Most preferably, the bivalent cation is a magnesium, zinc or calcium ion or a combination thereof. The trivalent cation is preferably selected from the group of trivalent aluminum, chromium, iron, cobalt and manganese ions and combinations of these trivalent cations. Most preferably, the trivalent cation is an aluminum, chromium or iron ion or a combination thereof.

Before a layered double hydroxide can be incorporated in a polymeric matrix for forming a nanocomposite material according to the invention, it should be modified so as to be compatible and/or reactive with the material of the polymeric matrix. To that end, the layered double hydroxide comprises at least 20%, preferably at least 60%, more preferably at least 80%, based on the total number of anions of the layered double hydroxide, of an amount of anions that are reactive and/or compatible with the polymeric matrix. The total number of anions on which the specified amounts of reactive and/or compatible anions are based is understood not to include the hydroxyl groups present in the layered double hydroxide.

It is particularly preferred that the layered double hydroxide contains at least 95%, based on the total number of anions of the layered double hydroxide, of an amount of anions that are reactive and/or compatible with the polymeric matrix. It has been found that a very homogeneous dispersion of the layered double hydroxide in the polymeric matrix is obtained when such a large amount of reactive and/or compatible anions is present. This dispersion forms a nanocomposite material having uncommonly favorable properties.

When a natural layered double hydroxide is used in a nanocomposite material according to the invention, this natural material will normally not contain the desired compatible and/or reactive anions. Therefore, the anions naturally present in natural hydrotalcites, such as chloride or nitrate ions, can be exchanged for the desired anions. If a synthetic layered double hydroxide is used, the desired anions may already have been introduced in the synthesis of the material. In the case of a synthetic layered double hydroxide, too, of course, the anions that are compatible and/or reactive with the polymeric matrix can be introduced by exchange. The exchange can be carried out in any known manner, for instance as described by Sugahara et al., in Ceramics International, 14(1988), 163–167.

Preferably, the ion exchange is carried out by suspending the layered double hydroxide in water, whereafter the pH of the suspension is reduced to a value of less than 4. Next, the anions with which the intended exchange is to be effected are added to the suspension and the pH is adjusted to a value in excess of 8. It has been found that this procedure leads to a superior exchange product. Further, the procedure can be carried out readily and in a short time.

It has been found that a layered double hydroxide can be modified with anions that are solely compatible, solely reactive, or both, with the polymeric matrix, to obtain a homogeneous dispersion of the layered double hydroxide in the polymeric matrix. Suitable compatible anions can be selected from anions of carboxylic acids, sulfonic acids, phosphonic acids and sulfate acids which contain an alkyl or an alkyl phenyl group having 6 to 22 carbon atoms. Of course, it is also possible to use combinations of these anions. One skilled in the art will be able to select suitable anions for a polymeric material whose properties he seeks to improve by incorporating a layered double hydroxide.

Anions that are reactive with the polymeric matrix can likewise be selected from the above group of anions of carboxylic acids, sulfonic acids, phosphonic acids and hydrogen sulfates which contain an alkyl or an alkyl phenyl group having 6 to 22 carbon atoms. In this case, the alkyl or alkyl phenyl chain should comprise a group which is reactive with the polymeric matrix. This reactive group can be present both attached to a terminal methylene group of the chain and at a different position in the chain. Examples of such reactive groups are hydroxy, amino, epoxy, vinyl, isocyanate, carboxy, hydroxyphenyl and anhydride. Of course, combinations of the above reactive anions can be used. The choice of the reactive group can be suitably based by the artisan on the nature of the material of the polymeric matrix. It has been found that a nanocomposite material based on a layered double hydroxide that contains the reactive anions mentioned is exceptionally stable. Depending on the nature of the polymeric matrix, the reactive anions mentioned may also be compatible with the polymeric matrix, which yields a still stabler nanocomposite material.

An important aspect of the invention is that at least 5%, preferably at least 20%, of the above-described compatible and/or reactive anions further contain a second charge-carrying group. The first charge-carrying group is the carbonate, sulfonate, phosphonate, or sulfate group, already mentioned above. Without wishing to be bound to any theory, the expectation is that a second charge-carrying group provides a repellent force which forces apart the sheets from which the layered double hydroxide is made up. Thus the layered structure of the layered double hydroxide is eliminated and a homogeneous mixing with a polymeric matrix is possible. Examples of suitable charge-carrying groups in this connection are ammonium, phosphonium, sulfonium, carboxylate, sulfonate, phosphonate and sulfate groups. Preferably, the second charge-carrying group is a cationic group. In this connection, the term charge-carrying group is understood also to include groups, such as amino groups, which can be ionized under certain conditions. Further, it will be clear that some of the charge-carrying groups mentioned may also be reactive with the polymeric matrix. It has been found that the use of anions which contain these charge-carrying groups leads to a particularly homogeneous nanocomposite material.

The invention further relates to a method for preparing a nanocomposite material as described above. That preparation can take place by first preparing a synthetic layered double hydroxide which contains the desired anions, but it is also possible to start from a ready layered double hydroxide and subject this to an ion exchange. Further, the layered double hydroxide modified with the desired anions is mixed with the polymeric matrix to form the nanocomposite material.

Instead of mixing the layered double hydroxide with a polymeric material, it is also possible to mix the layered double hydroxide with monomeric material, from which, in a polymerization reaction in the presence of the layered double hydroxide, the polymeric matrix can be formed.

In the preparation of a nanocomposite material according to the invention, it is preferred to grind or pulverize the layered double hydroxide beforehand. Such a pretreatment of the layered double hydroxide enables readier and better mixing of the various ingredients.

Bringing together the ingredients of a nanocomposite material according to the invention can be carried out by any suitable method, provided such method yields a proper mixing. Examples of methods for bringing together the ingredients comprise prolonged stirring at elevated temperature and extrusion. Suitable conditions for the mixing depend on the nature of the selected ingredients and can be simply determined by one skilled in the art. The extrusion, for instance, can be carried out between 40 and 250° C. in an extruder with a double screw. Especially when a ready polymeric matrix is mixed with a layered double hydroxide, it is preferred to mix the materials through extrusion.

The nanocomposite materials according to the invention are particularly suitable to be used for a large variety of applications. The materials are eminently processable and can be shaped in conventional shaping steps, such as injection molding and extrusion processes. Shaped articles of a variety of natures can be manufactured from the present nanocomposite material. Examples comprise any application for which the material of the polymeric matrix is suited. As preferred applications, fibers, packaging materials and construction materials can be mentioned.

What is claimed is:

1. A nanocomposite material comprising a polymeric matrix and a layered double hydroxide containing an amount of anions, wherein a) the polymeric matrix is present in an amount of at least 50% by weight, based on the nanocomposite material; b) at least 20% of the anions of the layered double hydroxide are compatible and/or reactive with the polymeric matrix, and c) at least 5% of the anions contain a second charge-carrying group.

2. A nanocomposite material according to claim 1, wherein the layered double hydroxide is a hydrotalcite or a hydrotalcite-like material.

3. A nanocomposite material according to claim 2, wherein the layered double hydroxide has an ion exchange capacity of 0.5 to 6 milliequivalents per gram and satisfies the formula (I)

$$[M_{(1-x)}^{2+}M_x^{3+}(OH)_2][A_{x/y}^{y-} \cdot n\, H_2O] \qquad (I)$$

wherein $M^{2+}$ is a bivalent cation, $M^{3+}$ is a trivalent cation, x is a number between 0.15 and 0.5, y is 1 or 2, n is a number from 1 to 10, and A is an anion selected from the group consisting of $Cl^-$; $Br^-$, $NO_3^-$;, $SO_4^{2-}$, $CO_3^{2-}$; anions compatible with the polymeric matrix and anions reactive with the polymeric matrix.

4. A nanocomposite material according to claim 3, wherein $M^{2+}$ is selected from the group consisting of $Mg^{2+}$, $Zn^{2+}$, $Ni^{2+}$, $Fe^{2+}$, $Cu^{2+}$, $Co^{2+}$, $Ca^{2+}$, $Mn^{2+}$ and combinations thereof.

5. A nanocomposite material according to claim 3, wherein $M^{3+}$ is selected from the group consisting of $Al^{3+}$, $Cr^{3+}$, $Fe^{3+}$, $Co^{3+}$, $Mn^{3+}$ and combinations thereof.

6. A nanocomposite material according to claim 3, which contains an amount of at least 20%, based on the total number of anions of the layered double hydroxide, of anions selected from the group consisting of anions of carboxylic acids, sulfonic acids, phosphonic acids and hydrogen sulfates, which contain an alkyl or an alkyl phenyl group having 6 to 22 carbon atoms.

7. A nanocomposite material according to claim 6, wherein the alkyl or phenyl group of the anion contains a reactive group selected from the group consisting of hydroxy, amino, epoxy, vinyl, isocyanate, carboxy, hydroxyphenyl and anhydride.

8. A nanocomposite material according to claim 1, which contains an amount of at least 80%, based on the total number of anions of the layered double hydroxide, which anions are compatible and/or reactive with the polymeric matrix and contain a second charge-carrying group.

9. A nanocomposite material according to claim 1, wherein the second charge-carrying group is selected from the group consisting of ammonium, phosphonium, sulfonium, carboxylate, sulfonate, phosphonate and sulfate groups.

10. A nanocomposite material according to claim 1, wherein the second charge-carrying group is a cationic group.

11. A nanocomposite material according to claim 1, wherein the polymeric matrix is present in an amount of at least 70% by weight, based on the nanocomposite material.

12. A nanocomposite material according to claim 1, wherein the polymeric matrix has a degree of polymerization of at least 20.

13. A nanocomposite material according to claim 1, wherein the polymeric matrix is selected from the group consisting of polyolefins, vinyl polymers, polyesters, polycarbonates, polyamides, polyurethanes and polyepoxides.

14. A method for preparing a nanocomposite material according to claim 1, wherein a polymeric matrix and a layered double hydroxide, which layered double hydroxide contains an amount of anions of at least 20%, based on the total number of anions of the layered double hydroxide, which are compatible and/or reactive with the polymeric matrix and contain a second charge-carrying group, are mixed in a ratio sufficient to provide the nanocomposite material comprises at least 50% by weight of the polymeric matrix.

15. A method for preparing a nanocomposite material according to claim 1, comprising mixing a monomeric material for forming a polymeric matrix and a layered double hydroxide which contains at least 20% of the anions, based on the total number of anions of the layered double hydroxide, which are compatible and/or reactive with the polymeric matrix and contain a second charge-carrying group polymerizing the monomeric material using an amount of monomeric material sufficient to provide the polymeric matrix present in the nanocomposite material in an amount of at least 50% by weight, based on the nanocomposite material.

16. A modified layered double hydroxide capable of being incorporated in a polymeric matrix comprising an anion-containing layered double hydroxide, at least 20% of said anions, based on the total number of anions of the layered double hydroxide, being compatible and/or reactive with the polymeric matrix and containing a second charge-carying group.

17. A shaped article of a nanocomposite material prepared according to the method of claim 14.

18. A shaped article made from a nanocomposite material prepared according to the method of claim 15.

19. A method according to claim 8, which contains an amount of at least 95% based on the total number of anions of the layered double hydroxide.

20. The nanocomposite material of claim 1, wherein at least 20% of said anions contain a second charge-carrying group.

* * * * *